No. 881,488. PATENTED MAR. 10, 1908.
F. J. ROCHOW.
VEHICLE FOR TRANSPORTING LIVE FISH.
APPLICATION FILED NOV. 17, 1906.
4 SHEETS—SHEET 1.
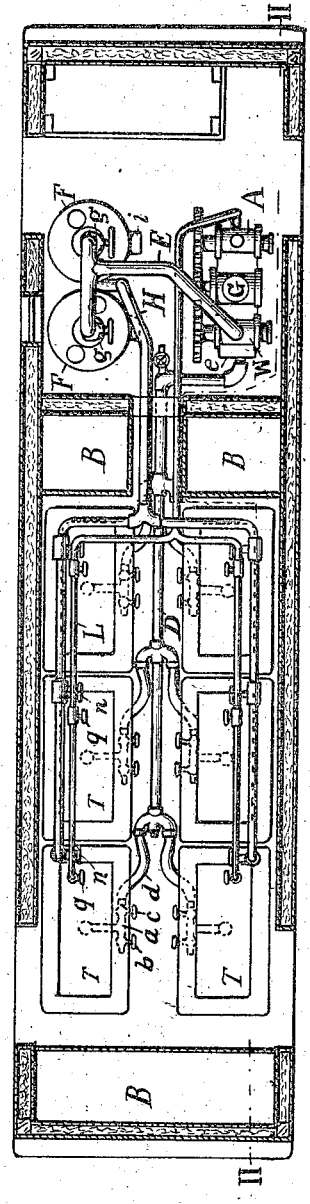
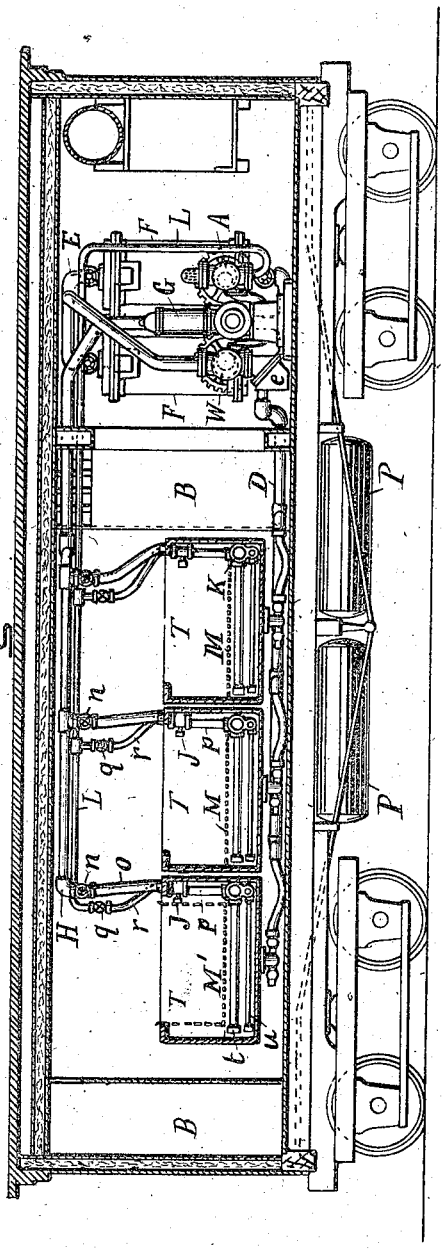
Witnesses:
Samuel W. Balch
James T. Dew
Inventor,
Ferdinand J. Rochow
by Thomas Ewing Jr.,
Attorney.

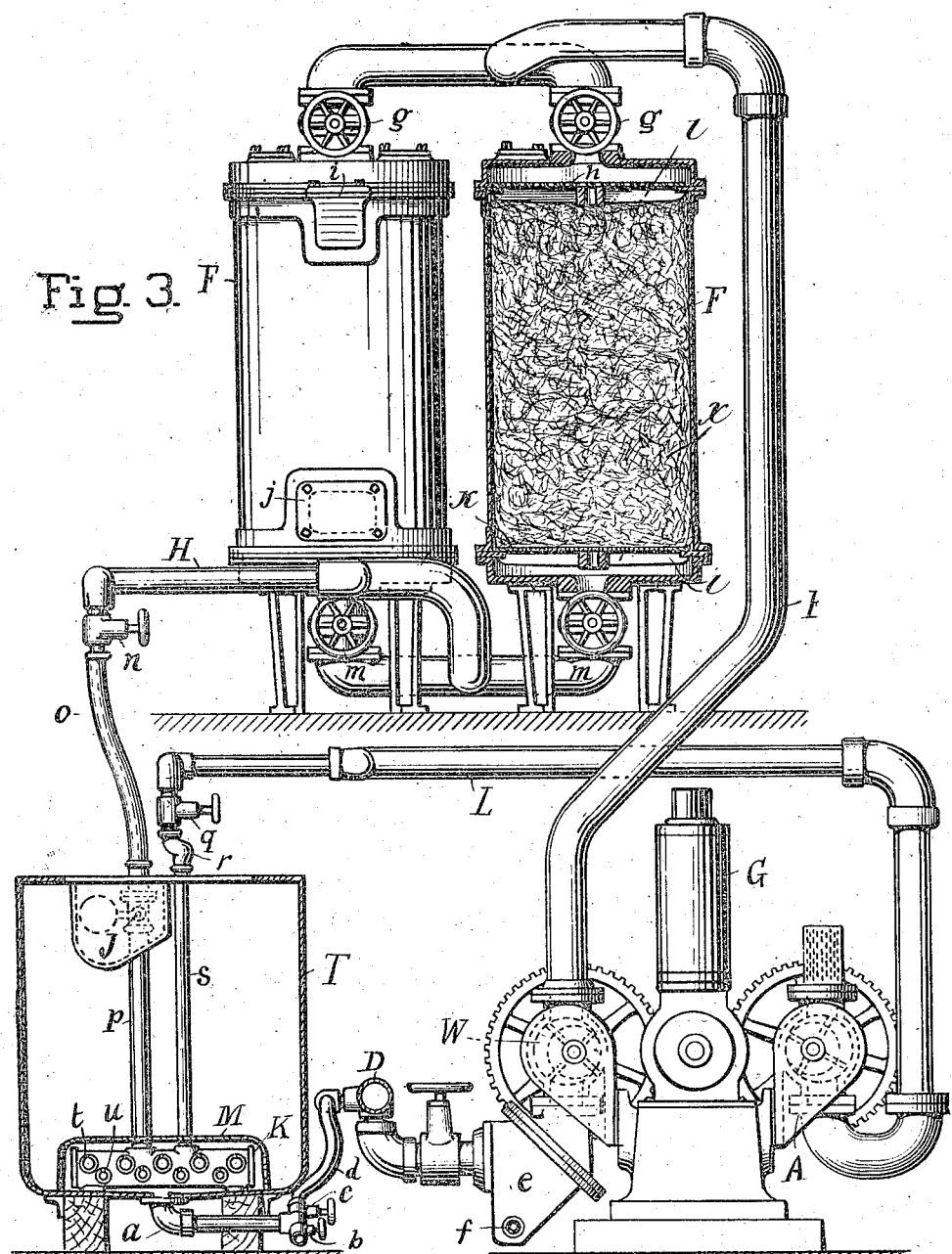

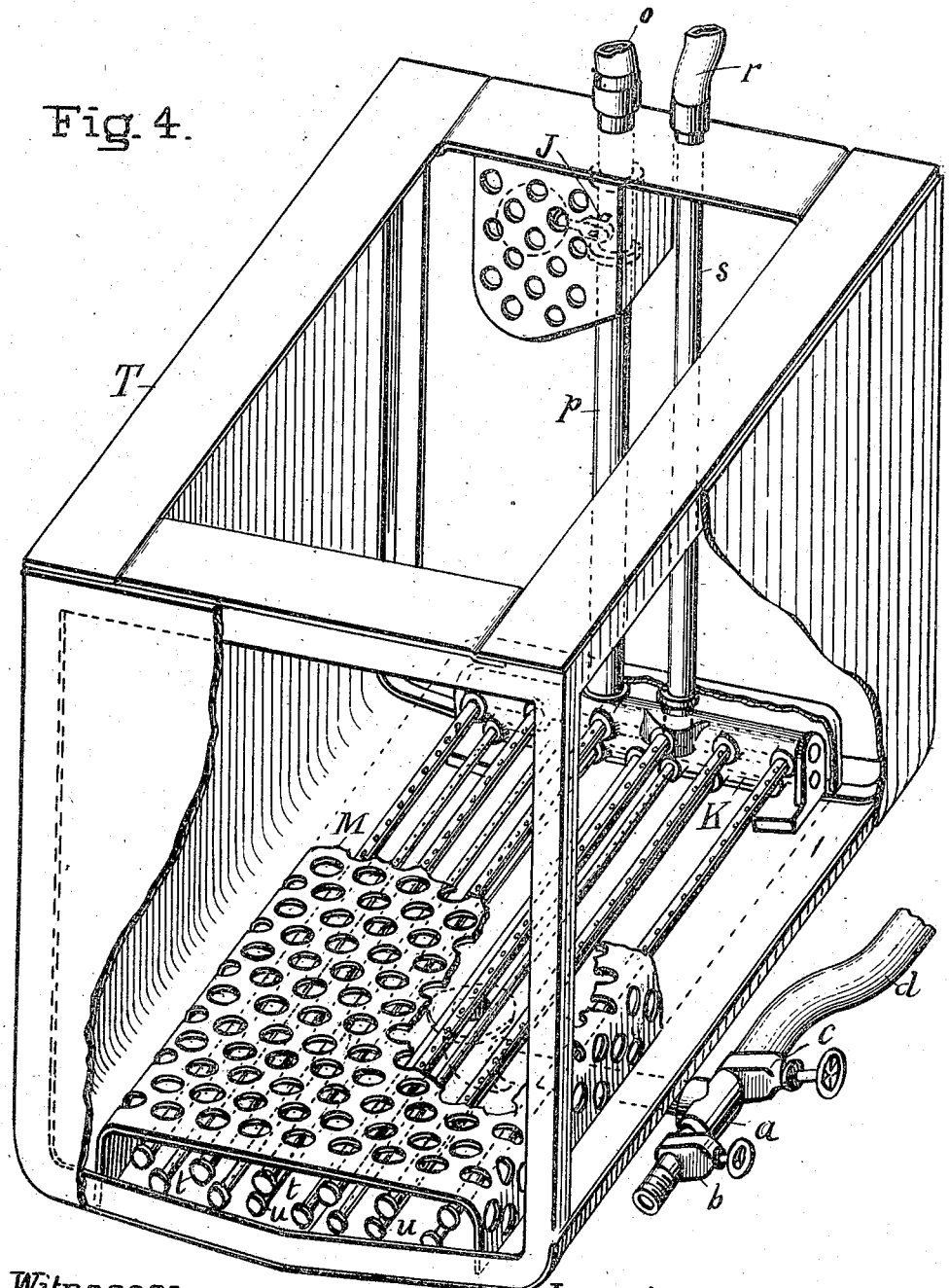

No. 881,488. PATENTED MAR. 10, 1908.
F. J. ROCHOW.
VEHICLE FOR TRANSPORTING LIVE FISH.
APPLICATION FILED NOV. 17, 1906.
4 SHEETS—SHEET 4.
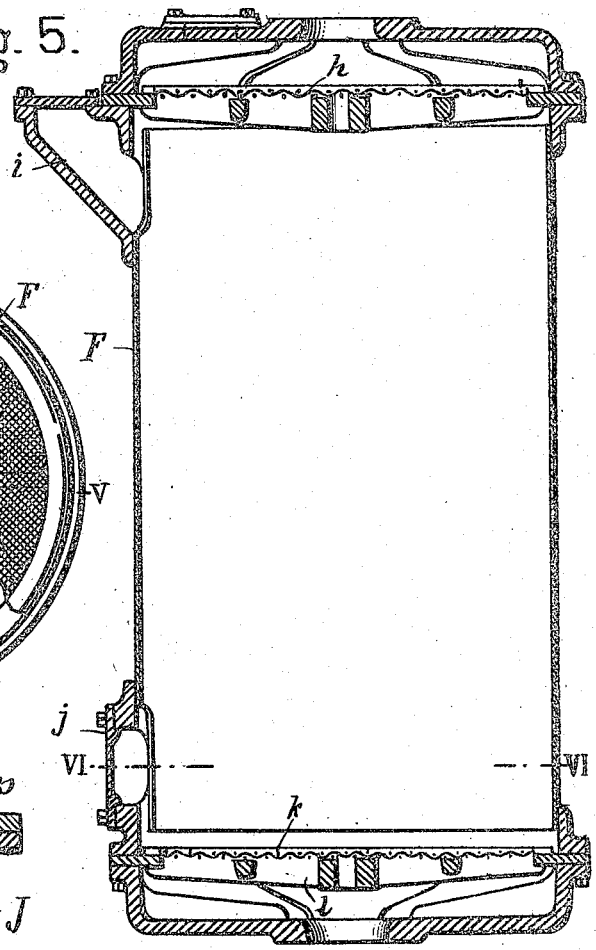
Fig. 5.
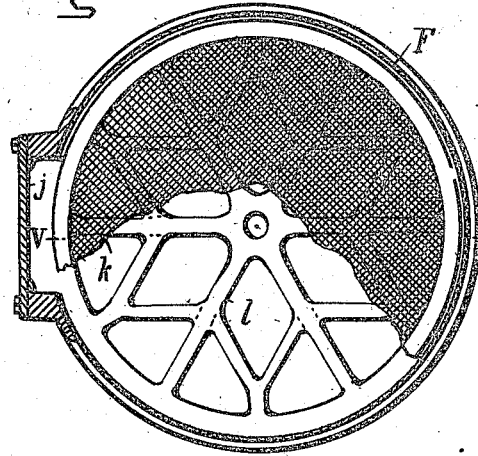
Fig. 6.
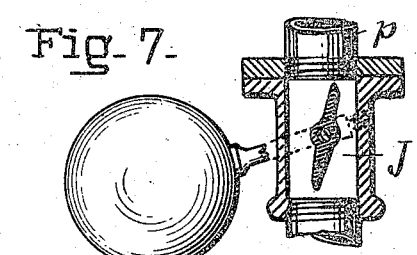
Fig. 7.
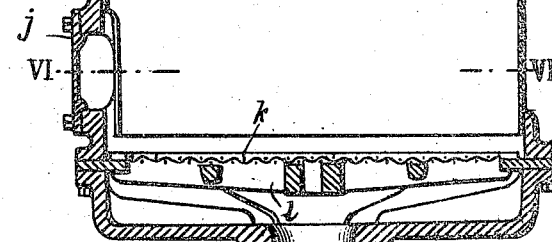
Fig. 8.
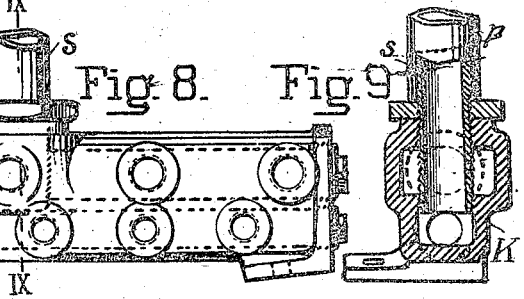
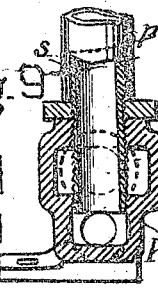
Fig. 9.
Witnesses:
Samuel W. Balch
James T. Saw
Inventor,
Ferdinand J. Rochow.
by Thomas Ewing Jr.,
Attorney.

UNITED STATES PATENT OFFICE.

FERDINAND J. ROCHOW, OF NEW YORK, N. Y., ASSIGNOR TO CENTRAL FISH COMPANY, A CORPORATION OF NEW YORK.

VEHICLE FOR TRANSPORTING LIVE FISH.

No. 881,488.

Specification of Letters Patent.

Patented March 10, 1908.

Application filed November 17, 1906. Serial No. 343,819.

*To all whom it may concern:*

Be it known that I, FERDINAND J. ROCHOW, a citizen of the United States of America, and a resident of the borough of Brooklyn, in the city of New York, county of Kings, and State of New York, have invented certain new and useful Improvements in Vehicles for Transporting Live Fish, of which the following is a specification.

My invention relates particularly to the construction of vehicles for the transportation by rail, or otherwise, and subsequent preservation at the market in the same or similar apparatus, of live fish for food, which must be compactly and economically carried in order that the invention may be commercially practicable. The proper preservation of live fish under the conditions of transportation, requires, I find, forced circulation of the water, filtration, continuous recharging of the water with air, and refrigeration or the maintenance of a low temperature. The fish are carried in tanks closely packed so that the weight or volume of surrounding water may be as little as one and one-half to two times the weight or volume of the fish. As under such conditions the individual fish have no opportunity to seek positions in the compartments allotted to them where the water is in the most suitable condition, it is a further object of this invention to so construct the apparatus that the conditions above enumerated will be maintained with sufficient uniformity in all parts of the compartments containing fish. This I accomplish by pumping the water into the tanks and pumping it out, and pumping air into the water, all under complete control as to quantity, and while the water is in circulation it is subjected to filtration and cooling so that it is kept clean and at proper temperature. Uniformity of conditions throughout the fish compartments is maintained by the construction and disposition of the water and air inlets and outlets. Various vital parts of the apparatus which may require from time to time to be inspected and cleaned are in a plurality of units, so arranged as to be individually detachable without interfering with the continuous operation of the remaining parts.

For a consideration of the details, reference will now be made to the accompanying four sheets of drawings, which form a part of this application and show one form of embodiment of the invention, and in which—

Figure 1 is a plan view of a railway car fitted with tanks and other apparatus. Fig. 2 is a longitudinal section of the car on the line II—II of Fig. 1. Fig. 3 shows the apparatus with one tank, together with the proper connections, but with the several parts so distributed on the sheet as to admit of illustration on a larger scale, the tank and one filter being in section. Fig. 4 shows a perspective view of a tank with the walls and horizontal perforated partition plate broken away. Fig. 5 is a vertical section through a filter on the line V—V of Fig. 6. Fig. 6 is a horizontal section through the filter on the line VI—VI of Fig. 5. Fig. 7 shows a ball-valve for maintaining the proper water level in a tank. Fig. 8 is an elevation of the head which carries the air and water inlet pipes. Fig. 9 is a section through the head on the line IX—IX of Fig. 8.

The car is divided into two rooms or compartments with a communicating passageway. The walls of the rooms are made double and the interspaces filled with any suitable packing which is non-conducting for heat. In the larger of the two rooms are placed ice-bunkers B B, preferably of an open construction, and tanks T T for the reception of the live fish. The tanks are arranged along either side of the vehicle, leaving a narrow aisle between them. In the smaller room are located two filter-tanks F F, a rotary water-pump W, a rotary air-pump A, and a gas-engine G. The gas-engine is most conveniently operated by compressed gas drawn from tanks P P located beneath the car, as this is an especially safe source of power, is acceptable to the railroad companies, and facilities for recharging are generally available at important railway terminals. The form of pump, both for water and for air, which is illustrated, and which has proved especially suitable, is of the rotary type with a crescent-shaped chamber, patented to me in United States Letters Patent No. 33,961, of December 17, 1861.

Each of the tanks is rectangular and made of galvanized sheet iron riveted to an angle-iron frame. A sheet iron frame forms a top with an open center which arrests and turns back any splash along the sides which might be occasioned by uneven movement of the car. The center opening is usually loosely covered in any convenient way to prevent the fish from jumping out and to exclude light. The bottom of the tank is made slightly sloping toward a middle line. A drain connection $a$ is the outlet for the water and solid impurities. It leads toward the aisle of the car, where it terminates in a T-connection with valves $b$ and $c$ on either side and individual to each tank. Through the valve $c$ and a short length of rubber hose $d$ connection is made to a drain pipe D to which the outlets of all the tanks are connected. The valve $c$ when closed serves to isolate the tank from the system so far as its discharge is concerned, and the valve $b$ serves as a means for entirely drawing off the water from the tank after it has been isolated by shutting off all other connections. A nipple is provided on the valve so that a hose may be connected and the water discharged outside the car. The drain pipe leads into the pump, in its course passing upwardly through an enlarged elbow $e$ provided with an opening $f$ close to the bottom through which much of the larger and heavier solid matter, such as fish scales, may be blown out. The pump throws the water through a pipe E to the top of the car where it is delivered through inlet valves $g$ $g$ at the tops of the filter tanks. In each of these tanks the water passes first through a screen $h$ close to the top. This catches much of the solid matter and serves to spread and distribute the water in its further downward passage through the filtering medium $x$, usually bone charcoal, which fills the middle compartment of the filter. A hopper-shaped opening $i$ communicates with this compartment near the top, and a side opening $j$ communicates with it near the bottom. These are closed by removable plates and serve respectively for filling and for withdrawing the charcoal from the filter tank. A fine mesh screen $k$ supports the charcoal and permits the filtered and purified water to pass through and out at the bottom. The screen is supported by a cast-iron grate $l$. The water leaves the filters through outlet valves $m$ $m$. On closing the inlet and outlet valves of either filter-tank, it may be cut out of the system for cleaning and replenishing of charcoal while the other filter-tank is temporarily serving alone as the filter for the system.

From the outlet valves of the filter-tanks the water passes into a distributing pipe H by which it is conducted to the top of the car and into the tank room, where two branches are run, one over each row of tanks. In each branch are connections through valves $n$ $n$ over each tank and a flexible connection $o$ is made between each valve and a vertical pipe $p$ in the tank. In this pipe is a ball-valve $J$ which regulates the flow of water so as to maintain the level in the tank at the required height and not permit the inlet flow in any tank to gain over the discharge flow by reason of inequalities in the resistance in the various valves and branches or from the car standing on track which is not level. The vertical pipe communicates with the upper of two chambers formed in a head K at the bottom of the tank.

From the air-pump air is led through a distributing pipe L similarly branched and parallel with the distributing pipe for water in the tank room. From this pipe the air passes through valves $q$ $q$ one of which is over each tank, and flexible connections $r$ $r$ each of which is connected to a vertical pipe $s$ in the tank and connects with the lower of the two chambers in the head in the tank. Parallel horizontal water inlet pipes $t$ $t$ and air inlet pipes $u$ $u$ lead from the upper and lower chambers in the head respectively across the bottom of the tank, and fine perforations along these pipes are the inlets through which water and air are respectively injected into the tank. It will be seen that these form a distributed series of inlets over the major part of the bottom of the tank and that the air rising past the water-inlets serves to carry up the injected water. For the double purpose of preventing the fish from becoming wedged among these pipes, and also to give the injected air and water a better opportunity to commingle before reaching the fish, a horizontal perforated partition plate M is laid over the air and water inlet pipes, and contacting at its margins with the walls of the tank divides the tank into two compartments, the lower compartment containing the water and air inlet pipes and the upper compartment containing the fish. If desired, this plate may be given the form of a basket, as at M' Fig. 2, by which the fish may be lifted out of the tank and transferred in unloading from the car to other vehicles with tanks or to the market tanks.

In operation, the mingled water and air therefore pass through all parts of the horizontal perforated partition plate, the perforations of which constitute the inlets into the fish compartment, and the purified water rises therefrom through every part of the compartment. The air is in such excess that it will effectually scrub the water of all gaseous exhalations and disengage such at the surface of the water in the tanks, leaving the water heaviest at the top so that it will flow off at the sides and down the sides to the drain connection at the bottom of each tank underneath the inlet pipes.

The cooling of the water and air is ordinarily effected sufficiently by the presence of the ice in the bunkers in the tank room and the contact of the cooled air which flows from the bunkers with the walls of the tanks and the pipes. The temperature is further lowered, when necessary, by adding salt to the ice. As the engine radiates considerable heat, this part of the apparatus at least is located in a separate room.

The valve J is a balanced valve of the type known as a butterfly valve, with a valve disk mounted within the water supply pipe and actuated by the ball-float to automatically adjust the supply when the desired water level is reached, and preserve the level evenly, and in a manner which will be clear from the drawings.

Accommodations are provided in the vehicle for an attendant, and the vehicle is entirely self-contained as to all requirements for the fish, all supplies for a journey of two days or more being carried.

What I claim as new and desire to secure by Letters Patent of the United States is:

1. In a vehicle for conveying live fish, the combination in a circulating system of a tank, means for pumping water out of the tank and for forcing it back into the tank, and means for forcing air into the water on its entrance into the tank, substantially as described.

2. In a vehicle for conveying live fish, the combination in a circulating system of a tank, means for withdrawing water from and returning it to the tank, a filtering chamber through which the water is passed, means for refrigerating the water, and means for injecting air into the water on its entrance into the tank, substantially as described.

3. In a vehicle for conveying live fish, the combination of a tank, means for circulating water whereby it is withdrawn from and returned to the tank near the bottom thereof, and means for injecting air into the water on its entrance into the tank near the bottom thereof, substantially as described.

4. In a vehicle for conveying live fish, the combination in a circulating system of a fish compartment, means for pumping water and means for pumping air into the fish compartment, and water inlets and air inlets distributed over the bottom of the fish compartment, substantially as described.

5. The combination in a tank, of a perforated partition plate located near the bottom and forming in the tank above the plate a compartment for live fish, inlets for water located in the chamber formed below the plate, and an outlet for water below the plate, substantially as described.

6. The combination in a tank, of a perforated partition plate located near the bottom whereby a compartment for live fish is formed in the tank above the plate, a series of inlet pipes for water located in the compartment formed below the plate, and an outlet for water below the plate, substantially as described.

7. The combination in a tank, of a perforated partition plate located near the bottom whereby a compartment for live fish is formed in the tank above the plate, a series of inlet pipes for water and a series of inlet pipes for air located in the compartment formed below the plate, and an outlet for water, substantially as described.

8. The combination in a tank, of a series of spaced inlet pipes for water located near the bottom, and an outlet for water located directly beneath the inlet pipe, substantially as described.

9. In a vehicle for conveying live fish, the combination in a circulating system of a plurality of tanks, a distributing pipe, inlet pipes leading therefrom to each tank, balanced valves located in the inlet pipes, means whereby they are automatically actuated to preserve the required amount of water in each tank, a drain pipe, outlets from each tank connected therewith, and means for maintaining the circulation, substantially as described.

Signed by me at New York city (borough of Manhattan), this 16th day of November, 1906.

FERDINAND J. ROCHOW.

Witnesses:
THOMAS EWING, Jr.,
SAMUEL W. BALCH.